United States Patent [19]

Yamamoto et al.

[11] 3,758,661
[45] Sept. 11, 1973

[54] PROCESS FOR PRODUCING A SYNTHETIC PAPER

[75] Inventors: Sadao Yamamoto, Kyoto; Seiichirou Honda, Ibaraki; Akira Nishio, Takatsuki, all of Japan

[73] Assignee: Sekisui Kagaku Kogyo Kabushiki Kaisha, Osaka, Japan

[22] Filed: Dec. 24, 1970

[21] Appl. No.: 101,436

[30] Foreign Application Priority Data
Dec. 26, 1969 Japan.................................. 44/539
Dec. 26, 1969 Japan.................................. 44/540
Dec. 29, 1969 Japan.................................. 44/219
Jan. 12, 1970 Japan.................................. 45/3674
Jan. 12, 1970 Japan.................................. 45/3675
Jan. 12, 1970 Japan.................................. 45/3676
Jan. 16, 1970 Japan.................................. 45/4656
Jan. 16, 1970 Japan.................................. 45/4657

[52] U.S. Cl.............. 264/230, 161/164, 161/165, 161/402, 161/410, 260/41 A, 260/41 B, 260/889, 260/896, 260/897, 264/284, 264/289, 264/342 R, 264/345, 264/DIG. 13, 264/DIG. 71, 264/DIG. 73

[51] Int. Cl........ B29c 17/02, B29d 7/22, B29d 7/24

[58] Field of Search............... 264/DIG. 13, 210 R, 264/284, 288, 289, 345, 342 R, 230, DIG. 71, DIG. 73; 260/41 A, 41 B, 889, 896, 897; 161/164, 165, 402, 410

[56] References Cited
UNITED STATES PATENTS

| | | |
|---|---|---|
| 3,234,313 | 2/1966 | Miller et al......................... 264/230 |
| 3,576,927 | 4/1971 | Gregorian et al................ 264/230 X |
| 3,694,399 | 9/1972 | Schwarz............................ 260/41 B |
| 3,309,452 | 3/1967 | Yumoto et al..................... 264/284 |
| 3,637,906 | 1/1972 | Parathoen...................... 264/288 X |
| 3,154,461 | 10/1964 | Johnson........................ 264/DIG. 13 |
| 3,271,495 | 9/1966 | Gronholz et al................. 264/210 R |
| 3,426,754 | 2/1969 | Bierenbaum et al..... 264/210 R UX |

*Primary Examiner*—Philip E. Anderson
*Attorney*—Wenderoth, Lind & Ponack

[57] ABSTRACT

A synthetic paper comprising an olefinic resin is produced by stretching an unstretched sheet of an olefinic resin such as polyethylene under the temperature conditions (1) or (2) below:

1. at a temperature lower than the melting temperature of said resin, the temperature of the inner layer of the sheet being different from that of both surface layers by at least 10°C., and
2. at a temperature such that either one of the surface layers and the inner layer is maintained at a temperature lower than the melting temperature of said resin, and the other is maintained at a temperature not lower than the melting temperature of said resin and higher than the melting temperature by 40°C. or less.

The synthetic paper is light in weight and has high strength in addition to other desirable properties and finds utility as packaging and printing.

6 Claims, No Drawings

PROCESS FOR PRODUCING A SYNTHETIC PAPER

This invention relates to a process for producing a synthetic paper, and more specifically, to a process for producing a synthetic paper comprising an olefinic resin, which is light in weight and has high strength.

A process for producing a synthetic paper by stretching an unstretched sheet composed of an olefinic resin and a filler has heretofore been known. But this prior method cannot give a synthetic paper in which voids are uniformly distributed along its entire sectional area. A sheet having voids of large size distributed uniformly has a rough surface and good graphic properties with a writing instrument such as pen and pencils, and is moreover light in weight, but has the defect of considerably inferior strength. Conversely, a sheet having uniformly distributed voids of smaller size has satisfactory strength, but cannot be free from the defect of the heavy weight of synthetic paper.

With a view to removing these defects, we have attempted to produce a sheet whose upper and lower surfaces have voids of different sizes by passing an unstretched sheet of an olefinic resin between rolls having a difference in temperature by at least 10°C. In the resulting sheet, the size of voids on one surface is larger than that of the voids on the other. Hence, this sheet is satisfactory to some extent in its light weight and retention of strength. However, the physical properties of one surface differ from those of the other, and the sheet is often broken during printing owing to tension exerted on the sheet or blur occurs during printing. Thus, the sheet has only limited applications.

Accordingly, an object of the present invention is to provide a synthetic paper comprising an olefinic resin which has eliminated the aforementioned defects.

The synthetic paper produced according to the invention has a symmetrical void size distribution with respect to the horizontal center line of any section of the sheet when viewed macroscopically, and in the sectional structure of the stretched sheet of the olefinic resin, the void size of the inner layer differs from that of both surface layers. The synthetic paper of the invention is light in weight, and has high physical strengths such as tensile strength, tear strength or bending strength. Furthermore, it does not break under strain stress, and is good in printability with an aqueous or oily ink, stamps or typewriters, and graphic properties with a writing instrument such as pencils or pens.

According to the invention, there is provided a process for producing a synthetic paper which comprises stretching an unstretched sheet of an olefinic resin under temperature conditions (1) or (2):

1. at a temperature lower than the melting temperature of said resin, the temperature of the inner layer of the sheet being different from that of both surface layers by at least 10°C., and
2. at a temperature such that either one of the surface layers and the inner layer is at a temperature lower than the melting temperature of said resin, and the other is at a temperature not lower than the melting temperature of said resin and higher than the melting temperature by 40°C. or less.

The term "melting temperature" of the olefinic resin, as used in the specification and the appended claims, means the temperature above which crystals are no longer present (where the olefinic resin is crystalline); and the temperature above which the resin rapidly tends to flow (where the olefinic resin is non-crystalline or has extremely small crystallinity).

The olefinic resin to be used in the invention includes, homopolymers or copolymers of α-olefins, especially $C_2$—$C_4$ α-olefins, and their blends. It is desirable that the olefinic resin should have a melt index of not over 10, preferably from 0.01 to 5.

Specific examples of the homopolymers of $C_2$—$C_4$ α-olefins include high pressure polyethylene, medium pressure polyethylene, low pressure polyethylene, polypropylene and polybutene-1, and said homopolymers whose optional positions have been replaced by other atoms or atomic groups, such as chlorinated polyethylene or chlorinated polypropylene.

Examples of the copolymers of $C_2$—$C_4$ α-olefins are those of at least 50 percent of the α-olefins with a monomer copolymerizable therewith, for instance, ethylene/vinyl acetate copolymer, ethylene/vinyl chloride copolymer, ethylene/styrene copolymer, ethylene/ethyl acrylate copolymer, ethylene/propylene copolymer, ethylene/ propylene/vinyl chloride copolymer, propylene/styrene copolymer, propylene/ethyl acrylate copolymer, and propylene/vinyl acetate copolymer.

The olefinic resin to be used in the present invention can be blended with a resin having poor compatibility with the olefinic resin in an amount of up to 100 parts by weight, preferably from 5 to 80 parts by weight, per 100 parts by weight of said olefinic resin.

By the term "resin having poor compatability with the olefinic resin" is meant a resin which is not completely compatible with the olefinic resin but does not undergo substantial phase separation when blended with the olefinic resin in the process of producing an unstretched sheet. As such resin, there can be cited: styrene resins such as a homopolymer of styrene, a homopolymer of a styrene derivative such as α-methyl styrene, styrene/α-methylstyrene copolymer, and copolymers of styrene or styrene derivatives with other copolymerizable monomers, for example, styrene/methylmethacrylate copolymer, styrene/acrylonitrile copolymer, styrene/butadiene/acrylonitrile copolymer, methylmethacrylate/butadiene/styrene copolymer or α-methylstyrene/methylmethyacrylate copolymer; polyamide resins produced by the condensation of aminocarboxylic acids and the condensation between dibasic acids and diamines, such as nylon 66, nylon 6, nylon 610 and nylon 11; polyacetal resins such as a polymer of formaldehyde, or thermoplastic copolymers of formaldehyde with other copolymerizable monomers, for example, commercially available Delrin (trademark, Du Pont), Celanese (tradename, Cellanese Corporation), or Duracon (tradename, Polyplastics Corporation); polyacrylate resins such as methyl methacrylate resin, methyl methacrylate/styrene copolymer, methyl methacrylate/α-methylstyrene copolymer, and copolymers of methyl methacrylate with other copolymerizable monomers; vinyl chloride resins such as polyvinyl chloride, vinyl chloride/vinyl acetate copolymer, vinyl chloride/ethylene copolymer, vinyl chloride/vinylidene, and copolymers of vinyl chloride with other copolymerizable monomers; vinyl acetate resins such as vinyl acetate, vinyl acetate/vinyl chloride copolymer, vinyl acetate/ethylene copolymer, and copolymers of vinyl acetate with other copolymerizable monomers; phenoxy resins such as thermoplastic epoxy resins obtained by cocondensation of bisphenol A and epichlorohydrin; and rubbery high-molecular-weight substances such as polyisoprene, polyisobutylene, polybutadiene, polypropylene oxide, rubber ethylene/propylene copolymer, butyl rubber, styrene/-butadiene rubber, acrylonitrile rubber, chloroprene rubber, various acrylic rubbers, and natural rubbers.

Finely divided powders of an inorganic filler may be incorporated in the olefinic resin used in the invention. Examples of such inorganic filler include diatomaceous earth, silica, talc, kaolin, zeolite, mica, asbestos, calcium carbonate, magnesium carbonate, calcium sulfate, clay, alumina, barium sulfate, zinc sulfate, lithopone, titanium oxide, and zinc flower, especially preferred being diatomaceous earth, silica, talc, kaolin, zeolite, mica, and asbestos. The amount of the inorganic filler to be incorporated is not more than 300 parts by weight, preferably from 20 to 200 parts by weight per 100 parts by weight of the olefinic resin.

According to the desired use of the synthetic paper of the present invention, heat stabilizers, plasticizers, antistatic agents, lubricants, ultraviolet ray absorbents, dyestuffs, pigments, and other additives may be incorporated in the homopolymers, copolymers or blends thereof of the olefinic resins that are used in the present invention.

According to the process of the present invention, the olefinic resin described is first fabricated into a sheet. The term "sheet" is meant to include foils, films and plates. The sheet formation can be accomplished by any conventional method, such as extrusion, injection, rolling, compression, or blowing. For example, the olefinic resin is thoroughly kneaded by such a machine as a Banbury mixer, mixing roll, or extrusion kneader, and the molten resin is subjected to calender rolling to form it into a sheet. Alternatively, the resin is put into an extruder with or without prior kneading in a Henschel mixer or super mixer, kneaded and melted in the extruder, and extruded into a sheet form.

The thickness of the unstretched sheet of the olefinic resin so obtained depends upon the subsequent stretching step, the applications of the synthetic sheet, etc. Usually, the preferred thickness is about 0.2 mm to 5.00 mm, particularly 0.3 mm to 3.0 mm.

The unstretched sheet so obtained is then stretched in accordance with the process of the present invention.

According to a first method of the invention, the unstretched sheet of the olefinic resin is stretched at a temperature lower than the melting temperature of said resin with a temperature difference of not less than 10°C. provided between the inner layer and both surface layers of the sheet. This stretching leads to the production of a stretched sheet having a porous structure, in which the void size differs from the surface layers to the inner layer and macroscopically, the void size is symmetrical with respect to the center line of a section of the sheet. Depending upon the applications of the synthetic paper obtained by the invention, for instance, printing and writing, the void size of the surface layers can be made either smaller or larger than that of the inner layer.

According to a first embodiment of the invention, there is provided a process for stretching an unstretched sheet of the olefinic resin at a temperature lower than the melting temperature of the olefinic resin, the temperature of both surface layers being maintained at a point at least 10°C. higher than that of the inner layer.

The product obtained according to the first embodiment exhibits good printability especially with printing ink as the void structure of the surface layers of the sheet is finer and denser than that of the inner layer. The small void size of the surface layers of the product of the invention serves to retain the physical strength of the sheet, and the larger void size of the inner layer contributes to the light weight of the sheet.

The stretched sheet obtained by the first embodiment of the process of the invention can be further stretched at a temperature below the melting temperature of the olefinic resin and at a temperature either higher or lower than the temperature of the surface layers employed in the initial stretching. This second stretching results in further improvement of the surface characteristics of the stretched sheet and reduction of the density of the sheet.

According to a second embodiment of the process of the invention, there is provided a process for stretching an unstretched sheet of the olefinic resin at a temperature lower than the melting temperature of the olefinic resin, the temperature of the inner layer of the sheet being maintained at a point at least 10°C. higher than that of both surface layers.

The product obtained by the second embodiment is suitable for writing with pencils or pens as the void structure of the inner layer is finer and denser than that of both surface layers. The large void size of both surface layers of the product so obtained contributes to the light weight of the sheet, and the smaller void size of the inner layer serves to retain the physical strength of the sheet.

The stretched sheet can further be stretched at a temperature below the melting temperature of the olefinic resin and at a temperature either higher or lower than the temperature of the inner layer employed in the initial stretching. Thus, there can be obtained a product having more improved surface characteristics and lower density.

The temperature used for stretching an unstretched sheet can be determined by specifying the temperature of the surface layers after heating the unstretched sheet to the desired temperature of the inner layer. The temperature of the surface layers can be determined by various methods including a roll method in which the sheet is passed once or several times between hot or cold rolls maintained at a temperature differing from the inner layer temperature by at least 10°C.; an air heating or cooling method in which air having a temperature differing from the inner layer temperature by at least 10°C.; a heating oven or cooling oven method in which the sheet is passed through an oven maintained at a temperature differing from the inner layer temperature by at least 10°C.; or a heating tank or cooling tank method in which the sheet is passed through a tank of oil or water having a temperature differing from the inner layer temperature by at least 10°C.

It is preferred that the unstretched sheet be subjected to the temperature of the surface layers for the shortest possible time to avoid any influence of the surface layer temperature on the inner layer temperature.

The temperature used in the second stretching can be set by any of the above-mentioned methods for determining the temperature of the surface layers. In the second stretching, the temperature of the surface layers may be the same as or different from that of the inner layer.

The stretching may be carried out uniaxially or multiaxially at the same time or in the successive manner, by any conventional manner. The most common multiaxial stretching is a biaxial stretching in the longitudinal and transverse directions, and for this purpose, a tenter stretcher is conveniently used.

The stretch ratio may be such as to provide a void structure in the sheet, and differs according to the physical properties and uses, etc. of the product. Usually, in the case of the first stretching, the ratio in one direction is at least 1.5, preferably from 1.8 to 8, and in the case of the second stretching, it is at least 1.2, preferably from 1.5 to 2.0.

According to a second method of the process of the invention, an unstretched sheet of the olefinic resin is stretched at a temperature such that either one of the surface layers and the inner layer is below the melting temperature of the olefinic resin and the other is not lower than the melting temperature of the resin and not higher than the melting temperature by more than 40°C.

According to a first embodiment of the second method, there is provided a process for stretching an unstretched sheet of the olefinic resin at a temperature such that the surface layers are maintained at a temperature not lower than the melting temperature of the resin but higher than it by not more than 40°C., and the inner layer is maintained at a temperature below the melting temperature of the resin.

The stretched sheet obtained by this embodiment is a tough and light sheet in which both surfaces are smooth and the inner layer has a porous structure. The sheets are suitable for printing with a printing ink which contains a solvent capable of dissolving the molten surface layer.

According to a second embodiment of the second process, there is provided a process for stretching an unstretched sheet of the olefinic resin at a temperature such that the surface layers of the sheet is maintained at a temperature below the melting temperature of the resin and the inner layer is maintained at a temperature not lower than the melting temperature of the resin but higher than the melting temperature by not more than 40°C. This process leads to the production of a stretched sheet having porous surface layers and a substantially voidless inner layer. Since such sheet has porous surface layers, it is not only superior in printability and graphic properties, but also is light in weight and tough because of a dense film layer present inside.

The stretched sheet obtained by the second method of the invention in which either the surface layers or the inner layer is substantially free from voids can, if desired, be stretched further at a temperature lower than the melting temperature of the olefinic resin. By this stretching, it is possible to produce voids in the substantially voidless layer, and there can be obtained a synthetic paper whose section has a porous structure throughout, and the void size differs from the surface layers to the inner layer.

The stretching temperature in the second method can be prescribed in the same way as set forth above with respect to the first method, and the same stretching operations and ratios can be employed.

The stretched sheets obtained in accordance with the above-mentioned embodiments can be directly used in various applications such as printing, writing, or packaging. The sheets may be post-treated to improve the surface characteristics further.

The post-treatment can be performed, for instance, by heat-treating the stretched sheet at a temperature lower than the melting temperature of the olefinic resin under a tension which allows the shrinkage of the sheet. The term "under a tension which allows the shrinkage of the sheet" means the exclusion of a completely relaxed condition of the sheet. Specifically, it is preferred that the sheet be shrunk under a tension such as not to loosen the sheet, namely while sliding a sheet-holding device in follow-up of the shrinkage of the sheet. The shrinkage of the sheet may be at least 1 percent of the dimension before shrinkage. If the sheet is shrunk 2 to 10 percent, printability with an oily ink or graphic properties with a writing instrument become better, and the surface smoothness and luster also increase. The temperature needed for shrinking is below the melting temperature of the olefinic resin. Too low temperatures require long time to complete the shrinkage, and therefore, it is convenient that the temperature is as near as possible to the melting temperature. The shrinking temperature can be prescribed by any conventional means such as hot air, infrared heater, water or oil bath.

Another method of post-treating the stretched sheet involves subjecting the sheet to calender rolling with or without prior impregnation of a dispersion or solution of a thermoplastic resin such as styrene resins, polyvinyl resins, vinyl acetate resins, polyacrylate resins, or polyamide resins, or of a thermosetting resin such as phenolic resins, urea resins, melamine resins, or ketone resins. The calendering can be performed at a temperature lower than the melting temperature of the olefinic resin with a pressure between rolls being maintained at 10 kg/cm$^2$ to 70 kg/cm$^2$, preferably 30 kg/cm$^2$ to 60 kg/cm$^2$. By this calendering, the voids on the surface layers of the stretched sheet become finer and denser, and the printability and graphic properties of the sheet are even more improved. In addition, the calendered sheet has superior stiffness, surface luster, surface smoothness and surface strength.

The synthetic paper obtained by the process of the present invention has a porous inner layer and porous surface layers, in which the void size differs from the inner layer to the surface layers and the void size distribution is symmetrical with respect to the center of the sheet. The synthetic paper of the invention has a lower density, lighter weight and better non-transparency than the conventional olefinic resin sheets of porous structure. Furthermore, it is excellent in physical strengths such as tensile strength, tear strength, and bending strength, and in graphic properties with a writing instrument, typographical properties with stamps or typewriters, or printability with a printing ink.

The synthetic paper obtained by the process of the invention also has good water resistance, and is suitable for uses which require water resistance.

The synthetic paper obtained by the present invention are therefore suitable as packaging materials with beautiful multicolor printing, printing papers for posters, picture books, books, or calendars, wrapping materials for general use, cushion materials, air-permeable packaging materials. This sheets are particularly suitable for use in a dictionary printing. It is also useful as notebook paper or drawing paper which require graphic properties.

The synthetic paper of the invention also finds utility as building or decorative materials for use in walls, roofs, and ceilings and also as agricultural or horticultural materials, for use in greenhouses for instance.

Various uneven patterns can be imparted to the synthetic paper obtained by the process of the invention by embossing, and other synthetic resins can be adhered thereto by thermal treatment. Such processed synthetic paper can be used for instance as materials of book binding or bag making.

The following Examples will further illustrate the present invention. Unless otherwise specified, all parts in the Examples are parts by weight.

In the Examples, the density and tensile strength of the sheet and the melting temperature of the olefinic resin were measured in accordance with the following methods.

Density : Dividing the weight in grams of the sheet per centimeter by the thickness of the sheet in centimeter (unit g/cm$^3$).

size distribution is symmetrical with respect to the center line of a section of the sheet. The stretched sheet was superior in whiteness and non-transparency, and had a density of 0.665 g/cm$^3$.

EXAMPLES 2 TO 16

A 0.5 mm-thick stretched sheet of an olefinic resin was formed in a manner similar to that set forth in Example 1, and stretched at the same ratio both longitudinally and transversely at a rate of 100 cm per minute. The stretched sheet obtained had small density and was light in weight. It also had good non-transparency, smoothness and physical strengths, and also good printability such as ink setting and drying properties.

Microscopic photograph of the section of each of the resulting sheets indicated that both the inner layer and the surface layers have a porous structure, the void size of the surface layers is smaller than that of the inner layer, and the void size distribution is symmetrical with respect to the center of the section of the sheet section. The results are given in Table 1.

TABLE 1

| Examples Nos. | Composition of unstretched sheet | Melting temperature of the olefinic resin (°C.) | Stretching conditions ||| Density (g./cm.³) |
|---|---|---|---|---|---|---|
| | | | Temperature of the surface layers (°C.) | Temperature of the inner layers (°C.) | Stretch ratio (X in one direction) | |
| 2 | Low pressure polyethylene | 126 | 120 | 100 | 3 | 0.655 |
| 3 | Low pressure polyethylene (100 parts) chlorinated polyethylene (5 parts) | 126 | 120 | 100 | 3 | 0.638 |
| 4 | Low pressure polyethylene (100 parts) chlorinated polyethylene (10 parts) | 126 | 120 | 100 | 3 | 0.625 |
| 5 | ___do___ | 126 | 100 | 80 | 3 | 0.603 |
| 6 | Low pressure polyethylene (100 parts) silica powder (10 parts) | 126 | 120 | 100 | 3 | 0.620 |
| 7 | Low pressure polyethylene (100 parts) chlorinated polyethylene (10 parts) silica powder (10 parts). | 126 | 120 | 100 | 3 | 0.613 |
| 8 | Low pressure polyethylene (100 parts) polybutadiene (10 parts) | 126 | 120 | 100 | 3 | 0.623 |
| 9 | ___do___ | 126 | 125 | 110 | 1.5 | 0.785 |
| 10 | ___do___ | 126 | 80 | 60 | 5 | 0.375 |
| 11 | Polypropylene resin | 174 | 130 | 110 | 3 | 0.628 |
| 12 | Polypropylene (100 parts) chlorinated polyethylene (10 parts) | 174 | 130 | 110 | 3 | 0.618 |
| 13 | Polypropylene (100 parts) polybutadiene (10 parts) | 174 | 130 | 110 | 3 | 0.610 |
| 14 | Polypropylene (100 parts) silica powder (10 parts) | 174 | 130 | 110 | 3 | 0.610 |
| 15 | Polypropylene (100 parts) silica powder (10 parts) chlorinated polyethylene (10 parts). | 174 | 130 | 110 | 3 | 0.593 |
| 16 | Polypropylene (100 parts) polybutadiene (10 parts) | 174 | 130 | 110 | 1.5 | 0.758 |

Tensile strength : ASTM-D-638, at a pulling rate of 50 mm/min.

Melting temperature : ASTM-D-2117

EXAMPLE 1

Low pressure polyethylene resin (Hizex 6100 P, product of Mitsui Chemical Co., Ltd.) (having a melting temperature of 120°C.) was kneaded by a kneading roll heated to 150°C. the kneaded polyethylene was formed into a sheet having a thickness of 0.5 mm by a heat press heated at 180°C. The sheet was cooled to room temperature. Thereafter, the entire sheet was maintained at 80°C., and then passed twice through heated rolls whose surfaces were maintained at 124°C. The surfaces of the sheet were heated at 124°C., but the inner layer of the sheet was maintained at 80°C. by adjusting the rate of delivery of the sheet through the rolls to 12.0 meters per minute.

The sheet was then stretched at the above temperature to 2.5 times its original length both in the longitudinal and transverse directions. The stretching rate was adjusted to 100 cm per minute. Microscopic photograph of the section of the stretched sheet indicated that the inner layer and the surfaces layers have a porous structure, the voids size of the surface layers is smaller than that of the inner layer, and that the void

EXAMPLE 17

| | parts |
|---|---|
| Low pressure polyethylene (Hizex 6100 P) | 100 |
| Ethylene/vinyl acetate copolymer (Evaflex No. 40, tradename of the product of Mitsui Polychemical, Co., Ltd.) | 30 |
| Polystyrene resin (Sekisui Polystyrol HH-500, product of Sekisui Kagaku Kogyo K.K.) | 10 |
| Titanium oxide | 3 |
| Zinc sulfide/barium sulfide mixture | 7 |
| Silica powder | 30 |

The foregoing ingredients (the melting temperature of the olefinic resin being 126°C.) were kneaded for 20 minutes at 150°C. by a kneading roll, and formed into a sheet having a thickness of 0.5 mm by a kneading roll. The sheet was cooled down to room temperature, and the entire sheet was then maintained at 80°C. The sheet was then passed twice through heated rolls whose surfaces were maintained at 120°C. The surfaces of the sheet were heated to 120°C., but the inner layer of the sheet was maintained at about 80°C. by adjusting the rate of feeding the sheet between the heated rolls to 11.5 meters per minute.

The sheet was then stretched 2.5 times its original length both in the longitudinal and transverse directions.

Microscopic photograph of the section of the stretched sheet indicated that both the inner layer and the surface layers have a porous structure, the void size of the surface layers is smaller than that of the inner layer, and the void size distribution is symmetrical with respect to the center line of a section of the sheet. The stretched sheet had a density of 0.595 g/cm$^3$.

Printability test was performed on the resulting stretched sheet. It was found that the stretched sheet obtained in this Example has the same ink setting and drying properties as the commercially available art paper, and multicolor printing can be made on it. Thus, the stretched sheet obtained above was excellent in whiteness, non-transparency, smoothness, and physical strengths, and could be conveniently used as printing paper and wrapping paper.

EXAMPLE 18

| | parts |
|---|---|
| Low pressure polyethylene (Hizex 6100 P) | 50 |
| High pressure polyethylene (Sumikathene F-101-1, product of Sumitomo Chemical Co., Ltd.) | 50 |
| Styrene-vinyl acetate copolymer (Sumitate KC-10, product of Sumitomo Chemical Co., Ltd.) | 30 |
| Phenoxy resin (PAHJ, tradename of the product of Union Carbide Corporation | 15 |
| Kaolin | 20 |
| Silica powder | 20 |
| Titanium oxide | 5 |

A composition comprising the foregoing ingredients (the olefinic resins having a melting temperature of 126°C.) was kneaded for 15 minutes at 160°C. by a kneading roll, and formed into a sheet having a thickness of 0.5 mm by calender rolling. The sheet was cooled to room temperature, and then the entire sheet was maintained at 80°C. The sheet was subsequently passed twice through heated rolls whose surfaces were maintained at 100°C. The rate of feeding the sheet between the heated rolls was adjusted to 12.0 meters per minute. The sheet was stretched to 2.5 times the original length both in the longitudinal and transverse directions.

Microscopic photograph of the resulting stretched sheet indicated that both the inner layer and the surface layers have a porous structure, the void size of the surface layer is smaller than that of the inner layer, and the void size distribution of is symmetrical with respect to the center line of a section of the sheet. The stretched sheet had a density of 0.580 g/cm$^3$. The sheet so obtained was good in whiteness, non-transparency, smoothness, and physical strengths. Printability test indicated that the sheet obtained in this Example has better ink setting and drying properties than the commercially available art paper. Moreover, multicolor printing could be made on it, and the sheet proved suitable as printing paper and wrapping paper.

EXAMPLE 19

| | parts |
|---|---|
| Low pressure polyethylene (Hizex 6100 P) | 100 |
| Ethylene/vinyl acetate copolymer (Ultrathene 631, tradename of the product of Mitsui Polychemical Co., Ltd.) | 10 |
| Polystyrene (Sekisui Polystyrol HH-500, tradename of the product of Sekisui Kagaku Kogyo K.K.) | 10 |
| Styrene/butadiene copolymer (JSR-1502, tradename of the product of Japan Synthetic Rubber Co., Ltd.) | 20 |
| Silica powder | 40 |
| Titanium oxide | 5 |

A composition of the foregoing ingredients (the olefinic resin having a melting temperature of 126°C.) was kneaded for 15 minutes by a kneading roll heated at 160°C., and formed into a sheet having a thickness of 0.5 mm by calender rolling. The sheet was cooled to room temperature, and then the entire sheet was maintained at 80°C. The sheet was then passed twice through heated rolls whose surface temperatures were maintained at 120°C. The rate of feeding the sheet between the heated rolls was adjusted to 12.0 meters per second. The sheet was then stretched to 2.5 times its original length both in the longitudinal and transverse directions.

Microscopic photograph of the stretched sheet obtained indicated that both the inner layer and the surface layers have a porous structure, the void size of the surface layers is smaller than that of the inner layer, and the void size distribution is symmetrical with respect to the center line of a section of the sheet. The sheet had a density of 0.583 g/cm$^3$.

The stretched sheet so obtained was excellent in whiteness, non-transparency, smoothness and physical strengths. Printability test indicated that it has better ink setting and drying properties than the commercially available art paper. Multicolor printing could be made on it, and the sheet proved useful as printing paper and wrapping paper.

EXAMPLE 20

| | parts |
|---|---|
| Medium low pressure polyethylene (Staflene tradename of the product of Furukawa Chemical Industry, Co., Ltd.) | 100 |
| Styrene/vinyl acetate copolymer (Ultrathene 631) | 10 |
| Polybutadiene (JSR-B-R-01, tradename of the product of Japan Synthetic Rubber Co., Ltd.) | 20 |
| Polystyrene (Sekisui Polystyrol HH-500) | 10 |
| Diatomaceous earth | 30 |
| Titanium oxide | 5 |
| Zinc sulfide/barium sulfate mixture | 10 |

A composition consisting of the foregoing ingredients (the olefinic resin having a melting temperature of 129°C.) was kneaded for 15 minutes by a kneading roll heated at 150°C., and formed into a 0.5 mm thick sheet by calender rolling. The sheet was cooled to room temperature, and the entire sheet was maintained at 80°C. The sheet was then passed twice between heated rolls whose surfaces were maintained at 125°C. The rate of feeding the sheet between the heated rolls was adjusted to 12.0 meters per minute. The sheet was then stretched to 2.5 times its original length both in the longitudinal and transverse directions.

Microscopic photograph of the stretched sheet obtained indicated that both the inner and surface layers have a porous structure, the void size of the surface layers is smaller than that of the inner layer, and the void size distribution is symmetrical with respect to the center line of a section of the sheet. The sheet had a density of 0.635 g/cm$^3$.

The stretched sheet so obtained was excellent in whiteness, non-transparency, and physical strengths. Printability test indicated that the sheet obtained above has better ink setting and drying properties than the commercially available art paper. Multicolor printing could br made on it, and the sheet proved useful as printing paper and wrapping paper.

EXAMPLE 21

Low pressure polyethylene resin (Hizex 6100 P) (having a melting temperature of 126°C.) was kneaded by a kneading roll heated at 150°C., and formed into a 0.5 mm thick sheet by a heat press heated at 180°C. The sheet was cooled to room temperature, and the entire sheet was maintained at 125°C. The sheet was passed twice through water cooled rolls whose surfaces were maintained at 20°C.

The temperature of the inner layer was maintained at 125°C., but the surface layer of the sheet was maintained at about 80°C. by adjusting the rate of moving the sheet between the cold rolls to 12.0 meters per minute. The sheet was then stretched to 2.5 times the original length both in the longitudinal and transverse directions.

Microscopic photograph of the section of the stretched sheet obtained indicated that both the surface and inner layers have a porous structure, the void size of the surface layers is larger than that of the inner layer, and the void size distribution is symmetrical with respect to the center line of a section of the sheet. The sheet was excellent in whiteness and non-transparency, and had a density of 0.645 g/cm$^3$.

EXAMPLES 22 TO 34

Each of the olefinic resin compositions indicated in Table 2 was formed into a 0.5 mm thick sheet in a manner similar to that set forth in Example 21. The resulting sheet was stretched at a rate of 50 cm per minute at the same ratio both in the longitudinal and transverse directions under the stretching conditions shown in Table 2. The resulting stretched sheet had a small density, and therefore was light in weight. It was excellent in non-transparency and physical strengths, and had good printability such as ink setting and drying properties.

Microscopic photograph of the section of the sheet indicated that both the surface and inner layers have a porous structure, the void size of the surface layer is larger than that of the inner layer, and the void size distribution is symmetrical with respect to the center line of a section of the sheet.

EXAMPLE 35

An unstretched sheet produced in the same way as set forth in Example 17 was maintained at 125°C., and passed twice through water cooled rolls whose surfaces were maintained at 20°C. At this time, the inner layer of the sheet was maintained at 125°C., and the surface layers were maintained at about 80°C. by adjusting the rate of moving the sheet on the cooled rolls to 12.0 meters per minute. The sheet was then stretched to 2.5 times its original length both in the longitudinal and transverse directions.

Microscopic photograph of the section of the stretched sheet indicated that both the surface and inner layers have a porous structure, the void size of the surface layer is larger than that of the inner layer, and the void size distribution is symmetrical with respect to the center line of a section of the sheet. The stretched sheet obtained had a density of 0.598 g/cm$^3$.

The stretched sheet obtained was subjected to the printability test, and it was found that it has good printability such as ink setting and drying properties. Multicolor printing could be made on it. The sheet obtained also had excellent whiteness, non-transparency, smoothness, physical strengths, leather-like feel, and stiffness and feel similar to those of paper made of a material of natural origin, and were useful as printing paper and wrapping paper.

EXAMPLES 36 TO 40

Each of the resin compositions shown in Table 3 was formed into an unstretched sheet in the same manner as shown in Example 17, and stretched under the same conditions as given in Example 35. The stretched sheet had similar properties as those of the stretched sheet obtained in Example 35.

TABLE 3

| Example No. | Composition of unstretched sheet Ingredients | Amounts in parts by weight | Melting temperature of the olefinic resin (°C.) | Density of the stretched (g/cm$^3$) |
|---|---|---|---|---|
| 36 | Low pressure polyethylene (Hizex 6100P) | 100 | 126 | 0.588 |
|  | Ethylene/vinyl acetate copolymer (Ultrathene 631) | 10 |  |  |
|  | Ethylene/vinyl acetate copolymer (Sumitate KC-10) | 30 |  |  |
|  | Polystyrene resin (Sekisui Polystyrol HH-500) | 10 |  |  |
|  | Titanium oxide | 5 |  |  |
|  | Diatomaceous earth | 30 |  |  |
|  | Calcium carbonate | 20 |  |  |

TABLE 2

| Examples Nos. | Composition of unstretched sheet | Melting temperature of the olefinic resin (°C.) | Temperature of the surface layers (°C.) | Temperature of the inner layer (°C.) | Stretch ratio (X in one direction) | Density (g./cm.$^3$) |
|---|---|---|---|---|---|---|
| 22 | Low pressure polyethylene | 126 | 100 | 120 | 3 | 0.648 |
| 23 | do | 126 | 60 | 120 | 3 | 0.623 |
| 24 | Low pressure polyethylene (100 parts) chlorinated polyethylene (5 parts) | 126 | 100 | 120 | 3 | 0.635 |
| 25 | do | 126 | 60 | 120 | 3 | 0.618 |
| 26 | do | 126 | 100 | 100 | 3 | 0.780 |
| 27 | do | 126 | 100 | 120 | 1.5 | 0.383 |
| 28 | Low pressure polyethylene (100 parts) silica powder (10 parts) | 126 | 100 | 120 | 6 | 0.628 |
| 29 | Polypropylene (100 parts) | 174 | 110 | 140 | 3 | 0.630 |
| 30 | do | 174 | 60 | 120 | 3 | 0.608 |
| 31 | Polypropylene (100 parts) polybutene (5 parts) | 174 | 110 | 140 | 3 | 0.633 |
| 32 | do | 174 | 60 | 120 | 3 | 0.588 |
| 33 | do | 174 | 110 | 140 | 1.5 | 0.748 |
| 34 | do | 174 | 110 | 140 | 6 | 0.365 |

| 37 | Low pressure polyethylene (Hizex 6100P) | 100 | 126 | 0.595 |
| | Ethylene/vinyl acetate copolymer (Ultrathene 631) | 10 | | |
| | Polystyrene resin (Sekisui Polystyrol HH-500) | 10 | | |
| | Styrene/butadiene copolymer K-101, tradename of the product of Shell Chemical) | 20 | | |
| | Powdery silica | 40 | | |
| | Titanium oxide | 5 | | |
| 38 | Medium low pressure polyethylene resin (Staffene E-603, tradename of the product of Furukawa Chemical Industry Co., Ltd.) | 50 | 129 | 0.604 |
| | High pressure polyethylene resin (Sumikathene F-101-1, tradenamr of the product of Sumitomo Chemical) | 50 | | |
| 38 | Ethylene/vinyl acetate copolymer (Evaffex No. 40) | 30 | | |
| | Polystyrene resin (Sekisui Polystyrol HH-500) | 15 | | |
| | Kaolin | 25 | | |
| | Diatomaceous earth | 25 | | |
| | Titanium oxide | 7 | | |
| 39 | Low pressure polyethylene (Hizex 5300 B, tradename of the product of Mitsui Chemical) | 100 | 130 | 0.600 |
| | Ethylene/vinyl acetate Copolymer (Ultracene 631) | 10 | | |
| | Polybutadiene (JSR-B-R-01, Japan Synthetic Rubber Co., Ltd.) | 20 | | |
| | Polystyrene (Denka Styrol HI-E-2, product of Denki Kagaku Kogyo K.K.) | 10 | | |
| | Silica powder | 30 | | |
| | Titanium oxide | 5 | | |
| | Zinc Sulfide/barium sulfate mixture | 10 | | |
| 40 | Polybutene resin (polybutene BT, Huls Corporation) | 100 | 135 | 0.590 |
| | Polybutadiene (JSR-BR-01) | 10 | | |
| | Styrene/butadiene copolymer (K-101) | 20 | | |
| | Polyacetal resin (Duracon, Polyplastics Corp.) | 10 | | |
| | Kaolin | 20 | | |
| | Diatomaceous earth | 20 | | |
| | Titanium oxide | 7 | | |

EXAMPLE 41

| | Parts by weight |
|---|---|
| Polypropylene resin (Chisso Polypro 1014, Chisso Corporation) | 100 |
| Polypropylene resin (Vistal CC, Chisso Corporation) | 10 |
| Phenoxy resin (PAHJ, Union Carbide Corporation) | 10 |
| Polybutadiene (Dienerubber, Asahi Kasei Kogyo K. K.) | 20 |
| Diatomaceous earth | 20 |
| Silica powder | 20 |
| Titanium oxide | 7 |

A composition of the foregoing ingredients (the olefinic resin having a melting temperature of 174°C.) was kneaded for 15 minutes by a kneading roll heated at 180°C., and formed into a 0.5 mm thick sheet by calender rolling. The sheet was cooled to room temperature, and then maintained at a temperature of 170°C. for 5 minutes. The sheet was then passed twice through cooled rolls whose surfaces were maintained at 60°C. The surface of the sheet was maintained at 100°C. The rate of moving the sheet on the cooled rolls was adjusted to 12.0 meters per minute. The sheet was then stretched to 3.0 times its original length both in the longitudinal and transverse directions at a rate of 50 cm per minute.

Microscopic photograph of the section of the resulting stretched sheet indicated that both the surface and inner layers have a porous structure, the void size of the surface layer is larger than that of the inner layer, and the void size distribution is symmetrical with respect to the center line of a section of the sheet.

The stretched sheet so obtained was excellent in whiteness, non-transparency and physical strengths, and the printability test indicated that it has good ink setting and drying properties. The surface of the sheet had appearance and feel like those of leather.

EXAMPLE 42

High density polyethylene (Hizex 6100 P) (having a melting temperature of 126°C.) was kneaded by a kneading roll heated at 150°C., and formed into a 0.5 mm thick sheet by a heat press heated at 180°C. The sheet was cooled to room temperature, and then the entire sheet was heated to 80°C. The sheet was passed four times through rolls whose surface were maintained at 110°C. Immediately thereafter, the sheet was stretched to 3 times its original length both in the longitudinal and transverse direction at a rate of 60 cm per minute. The temperature of the sheet was 110°C., and the temperature of the inner layer of the sheet was maintained at about 80°C. by adjusting the rate of feeding the sheet between the rolls to 12.0 meters per minute.

Microscopic photograph of the resulting sheet indicated that both the inner and surface layers have a porous structure, the void size of the surface layer is smaller than that of the inner layer, and the void size distribution is symmetrical with respect to the center line of a section of the sheet. The resulting sheet had a density of 0.638 g/cm$^3$.

The sheet so stretched was then cooled to room temperature, and maintained at 120°C. The sheet was then further stretched to 1.8 times its original length both in the longitudinal and transvere directions at a rate of 50 cm per minute. Microscopic photograph of the section of the resulting sheet indicated that the voids in the surface layers are finer and denser. The sheet was excellent in whiteness and non-transparency, and had a density reduced to 0.520 g/cm$^3$.

When each of the stretched sheets obtained in Examples 17 to 20 was further stretched under the same conditions as set forth above, there was obtained a synthetic paper having improved surface characteristics and reduced density. The resulting sheet further stretched had excellent whiteness, non-transparency, smoothness and physical strengths. The printability test indicated that the synthetic paper has better printability such as ink setting and drying properties than commercial available art paper. Multicolor printing could be made on it, and the synthetic paper proved useful as printing paper and wrapping paper.

EXAMPLES 43 TO 57

Each of the resin compositions shown in Table 4 was formed into a 0.5 mm thick unstretched sheet in the same way as set forth in Example 42. The sheet was stretched under the primary stretching conditions at the ratio indicated both in the longitudinal and transverse direction at a rate of 60 cm per minute. The sheet was cooled to room temperature, and further stretched at 50 cm/min. under the secondary stretching conditions in Table 4.

Microscopic photograph of the section of the resulting sheet indicated that both the surface and inner layers have a porous structure, the void size of the surface layer is smaller than that of the inner layer, and the void size distribution is symmetrical with respect to the center line of a section of the sheet. The surface of the resulting sheet was finer and denser than that of the sheet obtained by the primary stretching, and showed the formation of voids. The sheet was light in weight because of its low density, and has excellent non-transparency, smoothness and physical strengths and printability such as ink setting and drying properties.

original length both longitudinally and transversely at a rate of 100 cm per minute.

Microscopic photograph of the section of the resulting stretched sheet indicated that both the surface and inner layers have a porous structure, the void size of the surface layer is smaller than that of the inner layer, and the void size distribution is symmetrical with respect to the center line of a section of the sheet. The stretched

TABLE 4

| Examples Nos. | Composition of unstretched sheet | | Melting temperature of the olefinic resin (°C.) | Primary stretching conditions | | |
|---|---|---|---|---|---|---|
| | Ingredients | Amounts in parts by weight | | Temperature of the surface layer (°C.) | Temperature of the inner layer (°C.) | Stretch ratio (X in one direction) |
| 43 | Low pressure polyethylene | | 126 | 120 | 100 | 3 |
| 44 | Low pressure polyethylene | 100 | 126 | 100 | 80 | 2 |
| | Chlorinated polyethylene | 5 | | | | |
| 45 | Low pressure polyethylene | 100 | 126 | 100 | 80 | 3 |
| | Chlorinated polyethylene | 15 | | | | |
| 46 | Low pressure polyethylene | 100 | 126 | 100 | 80 | 3 |
| | Chlorinated polyethylene | 10 | | | | |
| | Silica powder | 10 | | | | |
| 47 | Low pressure polyethylene | 100 | 126 | 100 | 80 | 3 |
| | Chlorinated polyethylene | 10 | | | | |
| | Silica powder | 30 | | | | |
| 48 | Low pressure polyethylene | 100 | 126 | 100 | 60 | 3 |
| | Chlorinated polyethylene | 10 | | | | |
| 49 | Polypropylene | | 174 | 130 | 110 | 3 |
| 50 | Polypropylene | 100 | 174 | 120 | 100 | 3 |
| | Polybutadiene | 5 | | | | |
| 51 | Polypropylene | 100 | 174 | 120 | 100 | 3 |
| | Polybutadiene | 10 | | | | |
| 52 | Polypropylene | 100 | 174 | 120 | 100 | 3 |
| | Chlorinated polyethylene | 10 | | | | |
| 53 | Polypropylene | 100 | 174 | 120 | 100 | 3 |
| | Silica powder | 20 | | | | |
| 54 | Polypropylene | 100 | 174 | 120 | 100 | 3 |
| | Chlorinated polyethylene | 10 | | | | |
| | Silica powder | 10 | | | | |
| 55 | Polypropylene | 100 | 174 | 120 | 100 | 3 |
| | Chlorinated polyethylene | 10 | | | | |
| | Silica powder | 20 | | | | |
| 56 | Polypropylene | 100 | 174 | 100 | 80 | 3 |
| | Chlorinated polyethylene | 10 | | | | |
| | Silica powder | 20 | | | | |
| 57 | Polypropylene | 100 | 174 | 120 | 100 | 2 |
| | Chlorinated polyethylene | 10 | | | | |
| | Silica powder | 20 | | | | |

| Example Nos. | Density of the primarily stretched Sheet (g/cm³) | Secondary Stretching conditions | | Density of the secondarily stretched sheet (g/cm³) |
|---|---|---|---|---|
| | | Temp. (°C.) | Stretch ratio | |
| 43 | 0.645 | 125 | 1.5 | 0.536 |
| 44 | 0.628 | 115 | 1.5 | 0.505 |
| 45 | 0.600 | 115 | 1.5 | 0.486 |
| 46 | 0.595 | 115 | 1.5 | 0.463 |
| 47 | 0.575 | 115 | 1.5 | 0.448 |
| 48 | 0.585 | 115 | 1.5 | 0.450 |
| 49 | 0.628 | 140 | 1.5 | 0.485 |
| 50 | 0.623 | 130 | 1.5 | 0.470 |
| 51 | 0.618 | 130 | 1.5 | 0.463 |
| 52 | 0.620 | 130 | 1.5 | 0.465 |
| 53 | 0.605 | 130 | 1.5 | 0.442 |
| 54 | 0.605 | 130 | 1.5 | 0.453 |
| 55 | 0.590 | 130 | 1.5 | 0.435 |
| 56 | 0.575 | 120 | 1.5 | 0.422 |
| 57 | 0.750 | 130 | 1.2 | 0.708 |

EXAMPLE 58

Low pressure polyethylene resin (Hizex 6100 P) (having a melting point of 126°C.) was kneaded by a kneading roll heated at 150°C., and formed into a 0.5 mm thick sheet by a heat press heated at 180°C. The sheet was cooled to room temperature, and then the entire sheet was maintained at 10°C. The sheet was then passed four times through heated rolls whose surfaces were maintained at 125°C. The surface of the sheet was heated at 125°C., and the temperature of the inner layer was maintained at about 100°C. by adjusting the rate of moving the sheet on the rolls to 12.0 meters per minute. The sheet was stretched to 3 times its sheet had a density of 0.675 g/cm³.

The sheet was then cooled to room temperature, and then maintained at 80°C. The sheet was stretched further to 1.5 times its primarily stretched length both in the longitudinal and transverse directions at a rate of 50 cm per minute.

Microscopic photograph of the resulting stretched sheet indicated that its surface characteristics have been further improved, and an innumerable number of small cracks are formed among the voids that make up the porous structure of the surfaces. The stretched sheet had excellent whiteness and non-transparency, and had a density of 0.540 g/cm³.

Each of the primarily stretched sheets produced in Examples 17 to 20 was subjected to a secondary stretching under the same conditions as mentioned above. By this stretching, there was obtained a synthetic paper having more improved surface characteristics and reduced density.

EXAMPLES 59 TO 73

Each of the olefinic resin composition shown in Table 5 was formed into a 0.5 mm thick unstretched sheet in the same way as set forth in Example 58. The sheet was stretched at a rate of 100 cm per minute under the primary stretching conditions given in Table 5. The resulting sheet was cooled to room temperature, and then further stretched at a rate of 50 cm per minute under the second stretching conditions shown in Table 5. Microscopic photograph of the section of the sheet so stretched indicated that both of the inner and surface layers have a porous structure, the void size of the surface layers is smaller than that of the inner layer, and the void size distribution is symmetrical with respect to the center line of a section of the sheet. An innumerable number of small cracks formed by the secondary stretching were present in the surface layers, and this led to the confirmation that very fine and dense voids were formed in the surface layers. The sheet so obtained had low density and was light in weight. It had excellent non-transparency, smoothness, and physical strengths, and also good printability such as ink setting and drying properties.

rolls whose surface were maintained at 80°C. Immediately after passage, the sheet was stretched to 3 times its original length both in the longitudinal and transverse directions at a rate of 100 cm per minute. The surfaces of the sheet were cooled at this time to 80°C. But the temperature of the inner layer was maintained at about 120°C. by feeding the sheet between the rolls at a rate of 12.0 meters per minute. Microscopic photograph of the section of the sheet indicated that both the surface and inner layers have a porous structure, the void size of the surface layer is larger than that of the inner layer, and the void size distribution is symmetrical with respect to the center of the section of the sheet. The stretched sheet had a density of 0.643 g/cm$^3$.

TABLE 5

| Examples Nos. | Composition of unstretched sheet | | Melting temperature of the olefinic resin (°C.) | Primary stretching conditions | | |
|---|---|---|---|---|---|---|
| | Ingredients | Amounts in parts by weight | | Temperature of the surface layer (°C.) | Temperature of the inner layer (°C.) | Stretch ratio (X in one direction) |
| 59 | Low pressure polyethylene | | 126 | 120 | 110 | 3 |
| 60 | Low pressure polyethylene | 100 | 126 | 120 | 100 | 3 |
| | Chlorinated polyethylene | 10 | | | | |
| 61 | Low pressure polyethylene | 100 | 126 | 120 | 100 | 3 |
| | Chlorinated polyethylene | 10 | | | | |
| 62 | Low pressure polyethylene | 100 | 126 | 120 | 100 | 3 |
| | Chlorinated polyethylene | 10 | | | | |
| | Silica powder | 10 | | | | |
| 63 | Low pressure polyethylene | 100 | 126 | 120 | 100 | 3 |
| | Chlorinated polyethylene | 10 | | | | |
| | Silica powder | 20 | | | | |
| 64 | Low pressure polyethylene | 100 | 126 | 120 | 80 | 3 |
| | Chlorinated polyethylene | 10 | | | | |
| 65 | Polypropylene | 100 | 174 | 130 | 110 | 3 |
| 66 | Polypropylene | 100 | 174 | 120 | 105 | 3 |
| | Polybutadiene | 5 | | | | |
| 67 | Polypropylene | 100 | 174 | 120 | 105 | 3 |
| | Polybutadiene | 10 | | | | |
| 68 | Polypropylene | 100 | 174 | 120 | 105 | 3 |
| | Chlorinated polyethylene | 10 | | | | |
| 69 | Polypropylene | 100 | 174 | 120 | 105 | 3 |
| | Silica powder | 20 | | | | |
| 70 | Polypropylene | 100 | 174 | 120 | 105 | 3 |
| | Chlorinated polyethylene | 10 | | | | |
| | Silica powder | 10 | | | | |
| 71 | Polypropylene | 100 | 174 | 120 | 105 | 3 |
| | Chlorinated polyethylene | 10 | | | | |
| | Silica powder | 20 | | | | |
| 72 | Polypropylene | 100 | 174 | 120 | 105 | 3 |
| | Chlorinated polyethylene | 10 | | | | |
| | Silica powder | 20 | | | | |
| 73 | Polypropylene | 100 | 174 | 120 | 105 | 2 |
| | Chlorinated polyethylene | 10 | | | | |
| | Silica powder | 20 | | | | |

| Example Nos. | Density of the primarily stretched sheet (g/cm$^3$) | Secondary stretching conditions Temp. (°C.) | Stretch ratio | Density of the secondarily stretched sheet (g/cm$^3$) |
|---|---|---|---|---|
| 59 | 0.658 | 80 | 1.5 | 0.548 |
| 60 | 0.635 | 80 | 1.5 | 0.535 |
| 61 | 0.625 | 80 | 1.5 | 0.523 |
| 62 | 0.610 | 80 | 1.5 | 0.496 |
| 63 | 0.602 | 80 | 1.5 | 0.472 |
| 64 | 0.605 | 80 | 1.5 | 0.478 |
| 65 | 0.638 | 100 | 1.5 | 0.465 |
| 66 | 0.620 | 90 | 1.5 | 0.433 |
| 67 | 0.610 | 90 | 1.5 | 0.425 |
| 68 | 0.623 | 90 | 1.5 | 0.430 |
| 69 | 0.607 | 90 | 1.5 | 0.415 |
| 70 | 0.605 | 90 | 1.5 | 0.418 |
| 71 | 0.595 | 90 | 1.5 | 0.403 |
| 72 | 0.595 | 75 | 1.5 | 0.385 |
| 73 | 0.595 | 90 | 1.2 | 0.495 |

EXAMPLE 74

Low pressure polyethylene resin (Hizex 6100 P) was kneaded by a kneaded roll heated at 150°C., and formed into a 0.5 mm thick sheet by a heat press heated at 180°C. The sheet was cooled to room temperature, and then the entire sheet was heated to a temperature of 120°C. The sheet was then passed four times through The sheet was then cooled to room temperature, and then the entire sheet was maintained at 80°C. The sheet was stretched secondarily to 1.5 times its primarily stretched length both in the longitudinal and transverse directions at a rate of 50 cm per minute. Microscopic photograph of the resulting sheet indicated that the surface characteristics of the sheet are more improved, and the surface layers have a fine and dense, porous structure. The sheet so obtained had excellent whiteness and non-transparency. It had high stiffness, and exhibited a leather-like feel and appearance. The density of the sheet was 0.545 g/cm$^3$.

Each of the primarily stretched sheets produced in Examples 36 to 41 was further stretched under the conditions mentioned above. There was obtained a synthetic paper having more improved surface characteristics and reduced density. Such stretched sheet had excellent whiteness, non-transparency, and physical strengths. It had high stiffness and exhibited a leather-like feel and appearance at the surface. The printability test indicated that it has good printability such as ink setting and drying properties. Multicolor printing could be made on it, and the synthetic papers so obtained proved useful as wrapping paper or papers for building material such as wall paper.

Examples 75 TO 87

Each of the olefinic resin compositions shown in Table 6 was formed into a 0.5 mm thick unstretched sheet in the same manner as set forth in Example 74, and stretched at a rate of 100 cm per minute under the primary stretching conditions as shown in Table 6. The sheet was then cooled to room temperature, and further stretched at a rate of 50 cm per minute under the secondary stretching conditions shown in Table 6.

Microscopic photograph of the section of the resulting sheet indicated that both the inner and surface layers have a porous structure, the void size of the surface layer is larger than that of the inner layer, and the void size distribution is symmetrical with respect to the center line of a section of the sheet. It was also confirmed that very fine and dense voids were formed on the surfaces. The sheet obtained had a small density and therefore was light in weight. It had excellent non-transparency and physical strengths, and good printability such as ink setting and drying properties.

then the entire sheet was heated again to 115°C. The sheet was passed four times through heated rolls whose surfaces were maintained at 80°C. at a rate of 12.0 meters per minute. Immediately after passage, the sheet was stretched to 3 times its original length both in the longitudinal and transverse directions at a rate of 60 cm per minute. The sheet so stretched had a density of 0.638 g/cm³. The resulting sheet was cooled to room temperature, heated to a temperature of 125°C., and stretched to 1.8 times its primarily stretched length both in the longitudinal and transverse directions at a rate of 50 cm/min. Microscopic photograph of the section of the stretched sheet indicated that the void size of the surface layers is larger than that of the inner layer, and the void size distribution is symmetrical with respect to the center line of a section of the sheet. It was also found that voids which are finer and denser than the voids in the surface layers formed by the primary stretching are produced in the surface layer. The surfaces were of very fine and dense porous structure. The stretched sheet had excellent whiteness and non-transparency and good printability, and had a density of 0.510 g/cm³.

TABLE 6

| | Composition of unstretched sheet | | Melting temperature of the olefinic resin (°C.) | Primary stretching conditions | | |
|---|---|---|---|---|---|---|
| Examples Nos. | Ingredients | Amounts in parts by weight | | Temperature of the surface layer (°C.) | Temperature of the inner layer (°C.) | Stretch ratio (X in one direction) |
| 75 | Low pressure polyethylene | | 126 | 100 | 120 | 3 |
| 76 | Low pressure polyethylene | | 126 | 80 | 120 | 3 |
| 77 | Low pressure polyethylene | 100 | 126 | 100 | 120 | 3 |
| | Chlorinated polyethylene | 5 | | | | |
| 78 | Low pressure polyethylene | 100 | 126 | 60 | 100 | 3 |
| | Chlorinated polyethylene | 5 | | | | |
| 79 | Low pressure polyethylene | 100 | 126 | 100 | 120 | 3 |
| | Polybutadiene | 5 | | | | |
| 80 | Low pressure polyethylene | 100 | 126 | 100 | 120 | 3 |
| | Polybutadiene | 5 | | | | |
| | Silica powder | 10 | | | | |
| 81 | Polypropylene | | 174 | 120 | 140 | 3 |
| 82 | Polypropylene | 100 | 174 | 110 | 130 | 3 |
| | Chlorinated polyethylene | 5 | | | | |
| 83 | Polypropylene | 100 | 174 | 110 | 130 | 3 |
| | Polybutadiene | 5 | | | | |
| 84 | Polypropylene | 100 | 174 | 110 | 130 | 3 |
| | Silica powder | 10 | | | | |
| 85 | Polypropylene | 100 | 174 | 80 | 100 | 3 |
| | Polybutadiene | 5 | | | | |
| 86 | Polypropylene | 100 | 174 | 80 | 100 | 5 |
| | Polybutadiene | 5 | | | | |
| 87 | Polypropylene | 100 | 174 | 140 | 150 | 1.8 |
| | Polybutadiene | 5 | | | | |

| Example Nos. | Density of the primarily stretched sheet (g/cm³) | Secondary stretching conditions Temp. (°C.) | Stretch ratio | Density of the secondarily stretched sheet (g/cm³) |
|---|---|---|---|---|
| 75 | 0.668 | 100 | 1.5 | 0.568 |
| 76 | 0.643 | 100 | 1.5 | 0.533 |
| 77 | 0.635 | 80 | 1.5 | 0.530 |
| 78 | 0.618 | 80 | 1.5 | 0.525 |
| 79 | 0.623 | 80 | 1.5 | 0.525 |
| 80 | 0.618 | 80 | 1.5 | 0.520 |
| 81 | 0.635 | 100 | 1.5 | 0.470 |
| 82 | 0.630 | 100 | 1.5 | 0.440 |
| 83 | 0.625 | 100 | 1.5 | 0.435 |
| 84 | 0.610 | 100 | 1.5 | 0.433 |
| 85 | 0.590 | 80 | 1.5 | 0.427 |
| 86 | 0.398 | 80 | 2.5 | 0.350 |
| 87 | 0.730 | 130 | 1.2 | 0.718 |

EXAMPLE 88

Low pressure polyethylene resin (Hizex 6100 P) (having a melting temperature of 126°C.) was kneaded by a kneading roll heated at 150°C., and formed in a 0.5 mm thick sheet by a heat press heated at 180°C. The sheet was then cooled to room temperature, and Each of the primarily stretched sheets produced in Examples 36 to 41 was secondarily stretched under the same conditions as described above. The resulting synthetic paper had more improved surface characteristics and reduced density.

EXAMPLES 89 TO 101

Each of the olefinic resin compositions shown in Table 7 was formed into a 0.5 mm thick unstretched sheet, and stretched at a rate of 60 cm/min. under the primary stretching conditions given in Table 7. The sheet was cooled to room temperature, and then stretched at a rate of 50 cm per minute under the secondary stretching conditions shown in Table 7. The microscopic photograph of the section of the sheet indicated that both the surface and inner layers have a porous structure, the void size of the surface layer is larger than that of the inner layer, and the void size distribution is symmetrical with respect to the center line of a section of the sheet. It was also confirmed that voids which are finer and denser than the voids formed in the surface layers by the primary stretching were produced in the surface layers. The resulting sheet had a small density, and therefore was light in weight. It had excellent non-transparency, smoothness, and physical properties and good printability such as ink setting and drying properties.

tween the rolls to 12.0 meters per minute. The inner layer of the resulting sheet had a porous structure, and voids were not formed on the surface. The sheet had a density of 0.758 g/cm$^3$.

The sheet was then cooled to room temperature, and then maintained at a temperature of 110°C. Subsequently, the sheet was stretched to 1.5 times its original length at a rate of 50 cm/min. both in the longitudinal

TABLE 7

| | Composition of unstretched sheet | | Melting temperature of the olefinic resin (°C.) | Primary stretching conditions | | |
|---|---|---|---|---|---|---|
| | | | | Temperature of the surface layer (°C.) | Temperature of the inner layer (°C.) | Stretch ratio (X in one direction) |
| Examples Nos. | Ingredients | Amounts in parts by weight | | | | |
| 89 | Low pressure polyethylene | | 126 | 100 | 120 | 3 |
| 90 | do | | 126 | 80 | 120 | 3 |
| 91 | do | | 126 | 70 | 100 | 3 |
| 92 | do | 100 | 126 | 80 | 115 | 3 |
| | Chlorinated polyethylene | 5 | | | | |
| 93 | Low pressure polyethylene | 100 | 126 | 60 | 80 | 3 |
| | Chlorinated polyethylene | 5 | | | | |
| 94 | Low pressure polyethylene | 100 | 126 | 80 | 115 | 1.8 |
| | Chlorinated polyethylene | 5 | | | | |
| 95 | Low pressure polyethylene | 100 | 126 | 80 | 115 | 6 |
| | Chlorinated polyethylene | 5 | | | | |
| 96 | Low pressure polyethylene | 100 | 126 | 80 | 115 | 3 |
| | Polybutadiene | 5 | | | | |
| 97 | Low pressure polyethylene | 100 | 126 | 80 | 115 | 3 |
| | Silicia powder | 10 | | | | |
| 98 | Polypropylene | 100 | 174 | 120 | 140 | 3 |
| 99 | do | 100 | 174 | 110 | 130 | 3 |
| | Polybutadiene | 5 | | | | |
| 100 | Polypropylene | 100 | 174 | 110 | 130 | 1.8 |
| | Polybutadiene | 5 | | | | |
| 101 | Polypropylene | 100 | 174 | 110 | 130 | 6 |
| | Polybutadiene | 5 | | | | |

| Example Nos. | Density of the primarily stretched sheet (g/cm$^3$) | Secondary stretching conditions | | Density of the secondarily stretched sheet (g/cm$^3$) |
|---|---|---|---|---|
| | | Temp. (°C.) | Stretch ratio | |
| 89 | 0.648 | 125 | 1.5 | 0.536 |
| 90 | 0.643 | 125 | 1.5 | 0.515 |
| 91 | 0.625 | 125 | 1.5 | 0.508 |
| 92 | 0.630 | 125 | 1.5 | 0.503 |
| 93 | 0.565 | 120 | 1.5 | 0.475 |
| 94 | 0.770 | 125 | 1.2 | 0.735 |
| 95 | 0.385 | 125 | 2.0 | 0.305 |
| 96 | 0.620 | 125 | 1.5 | 0.500 |
| 97 | 0.620 | 125 | 1.5 | 0.495 |
| 98 | 0.635 | 145 | 1.5 | 0.485 |
| 99 | 0.625 | 140 | 1.5 | 0.470 |
| 100 | 0.740 | 140 | 1.2 | 0.715 |
| 101 | 0.390 | 140 | 2 | 0.320 |

EXAMPLE 102

Low pressure polyethylene resin (having a melting temperature of 126°C. was kneaded by a kneading roll heated at 150°C., and formed into a 0.5 mm thick sheet by a heat press heated at 180°C. The sheet was cooled to room temperature, and the entire sheet was maintained at 100°C. The sheet was then passed three times through rolls whose surfaces were maintained at 160°C. Immediately after passage, the sheet was stretched primarily to 3 times its original length both in the longitudinal and transverse directions at a rate of 100 cm/min. The temperature of the surface of the sheet was heated to 160°C., but the inner layer was maintained at about 100°C. by adjusting the rate of feeding the sheet beand transverse directions. The microscopic photograph of the resulting sheet indicated that fine and dense voids are formed from the inner layer towards the surface layers, and the surface also has a fine and dense, porous structure. The resulting sheet had unique luster, and excellent whiteness, non-transparency, smoothness and physical strengths. The density of the sheet was 0.560 g/cm$^3$.

EXAMPLES 103 TO 114

Each of the olefinic resin compositions shown in Table 8 was formed into a 0.5 mm thick sheet in the same manner as set forth in Example 102. The sheet was stretched at a rate of 60 cm/min. There was obtained a smooth sheet having a porous inner layer and voidless surface layers.

The sheet was cooled to room temperature, and then stretched at 50 cm/min. under the secondary stretching conditions as shown in Table 8. The microscopic photograph of the section of the resulting sheet indicated that both the inner and surface layers have a porous structure with fine and dense voids formed from the inner layer towards the surface layers. It was also confirmed that fine and dense voids are formed on the surface. The resulting sheet had low density, and therefore was light in weight. It had excellent non-transparency, smoothness and physical strengths and good printability such as ink setting and drying properties.

TABLE 8

| | Composition of unstretched sheet | | Melting temperature of the olefinic resin (°C.) | Primary stretching conditions | | |
|---|---|---|---|---|---|---|
| | | | | Temperature of the surface layer (°C.) | Temperature of the inner layer (°C.) | Stretch ratio (X in one direction) |
| Examples Nos. | Ingredients | Amounts in parts by weight | | | | |
| 103 | Low pressure polyethylene | | 126 | 160 | 110 | 3.0 |
| 104 | do | | 126 | 160 | 80 | 3.0 |
| 105 | do | 100 | 126 | 160 | 110 | 3.0 |
| | Chlorinated polyethylene | 5 | | | | |
| 106 | Low pressure polyethylene | 100 | 126 | 160 | 110 | 1.8 |

TABLE 8—Continued

| Examples Nos. | Composition of unstretched sheet | | Melting temperature of the olefinic resin (°C.) | Primary stretching conditions | | |
|---|---|---|---|---|---|---|
| | Ingredients | Amounts in parts by weight | | Temperature of the surface layer (°C.) | Temperature of the inner layer (°C.) | Stretch ratio (X in one direction) |
| 107 | Chlorinated polyethylene<br>Low pressure polyethylene<br>Chlorinated polyethylene | 5<br>100<br>5 | 126 | 160 | 110 | 6.0 |
| 108 | Low pressure polyethylene<br>Silica powder | 100<br>10 | 126 | 160 | 110 | 3.0 |
| 109 | Polypropylene | | 174 | 200 | 130 | 3.0 |
| 110 | Polypropylene<br>Chlorinated polyethylene | 100<br>5 | 174 | 200 | 130 | 3.0 |
| 111 | Polypropylene<br>Polybutadiene | 100<br>5 | 174 | 200 | 130 | 3.0 |
| 112 | Polypropylene<br>Polybutadiene | 100<br>5 | 174 | 200 | 130 | 1.8 |
| 113 | Polypropylene<br>Polybutadiene | 100<br>5 | 174 | 200 | 130 | 6.0 |
| 114 | Polypropylene<br>Polybutadiene | 100<br>5 | 174 | 200 | 130 | 6.0 |

| Example Nos. | Density of the primarily stretched sheet (g/cm³) | Secondary stretching conditions | | Density of the secondarily stretched sheet (g/cm³) |
|---|---|---|---|---|
| | | Temp. (°C.) | Stretch ratio | |
| 103 | 0.763 | 110 | 1.5 | 0.568 |
| 104 | 0.745 | 110 | 1.5 | 0.545 |
| 105 | 0.755 | 110 | 1.5 | 0.540 |
| 106 | 0.799 | 110 | 1.2 | 0.735 |
| 107 | 0.420 | 110 | 1.8 | 0.368 |
| 108 | 0.740 | 110 | 1.5 | 0.538 |
| 109 | 0.735 | 120 | 1.5 | 0.525 |
| 110 | 0.725 | 120 | 1.5 | 0.485 |
| 111 | 0.720 | 120 | 1.5 | 0.478 |
| 112 | 0.759 | 120 | 1.2 | 0.702 |
| 113 | 0.398 | 120 | 1.8 | 0.335 |
| 114 | 0.398 | 60 | 1.8 | 0.315 |

EXAMPLES 115 TO 120

Each of the resin compositions shown in Table 9 was kneaded by a kneading roll maintained at 160°C., and was formed into a 0.5 mm thick sheet by calender rolling. The sheet was primarily stretched under the same conditions as set forth in Example 102. There was obtained a sheet having a porous inner layer and voidless surface layers.

The sheet was further stretched under the same secondary stretching conditions as set forth in Example 102 to form a sheet which also had fine and dense voids on the surface. The results are given in Table 9.

TABLE 9

| Example No. | Composition of unstretched sheet | | Melting temperature of the main olefinic resin (°C.) | Density of sheet after the primary stretching (g./cm.³) | Density of the sheet after the secondary stretching (g./c.m.³) |
|---|---|---|---|---|---|
| | Ingredients | Amount in parts by weight | | | |
| 115 | Low pressure polyethylene<br>Ethylene/vinyl acetate copolymer<br>Polystyrene resin<br>Titanium oxide<br>Diatomaceous earth<br>Calcium carbonate | 100<br>40<br>10<br>5<br>30<br>20 | 126 | 0.735 | 0.520 |
| 116 | Low pressure polyethylene<br>Ethylene/vinyl actate copolymer<br>Polystyrene<br>Styrene/butadiene copolymer<br>Silica powder<br>Titanium oxide | 100<br>10<br>10<br>20<br>40<br>10 | 126 | 0.725 | 0.510 |
| 117 | Low pressure polyethylene<br>Ethylene/vinyl acetate copolymer<br>Polystyrene resin<br>Styrene/butadiene copolymer<br>Silica powder<br>Titanium oxide | 100<br>10<br>10<br>20<br>40<br>10 | 132 | 0.720 | 0.498 |
| 118 | Medium pressure polyethylene<br>High pressure polyethylene<br>Ethylene/vinyl acetate copolymer<br>Polystyrene<br>Kaolin<br>Diatomaceous earth<br>Titanium oxide | 100<br>50<br>30<br>15<br>25<br>25<br>7 | 126 | 0.750 | 0.538 |
| 119 | Low pressure polyethylene<br>Ethylene/vinyl copolymer<br>Polybutadiene<br>Polystyrene<br>Silica powder<br>Titanium oxide<br>Zinc sulfide/barium sulfate mixture | 100<br>10<br>20<br>10<br>30<br>5<br>10 | 126 | 0.720 | 0.550 |
| 120 | Polybutene resin<br>Polybutadiene<br>Styrene/butadiene copolymer<br>Polyacetal resin<br>Kaolin<br>Diatomaceous earth<br>Titanium oxide | 100<br>10<br>20<br>10<br>20<br>20<br>7 | 134 | 0.725 | 0.505 |

The sheets obtained in these Examples had good whiteness, non-transparency, smoothness and physical strengths. The printability test indicated that it has beeter printability such as ink setting and drying properties than the commercially available art paper. It proved useful as multicolor printed wrapping paper or papers for building or decorative materials.

EXAMPLE 121

|  | Parts |
|---|---|
| Polypropylene | 110 |
| Phenoxy resin | 10 |
| Polybutadiene | 20 |
| Diatomaceous earth | 20 |
| Silica powder | 20 |
| Titanium | 7 |

A composition of the foregoing ingredients (the polypropylene resin having a melting temperature of 174°C.) was kneaded for 15 minutes by a kneading roll heated at 180°C., and formed into a 0.5 mm thick sheet by a heater press. The sheet was cooled to room temperature, and then maintained at 120°C. It was then passed three times through rolls whose surfaces were maintained at 200°C., and immediately thereafter, stretched to 3 times its original length both in the longitudinal and transverse directions at a rate of 80 cm/min. The resulting sheet had a porous inner layer and voidless smooth surfaces and a density of 0.732 g/cm³. The sheet was cooled to room temperature, and then heated to 140°C. The sheet was stretched to 1.5 times the primarily stretched length at a rate of 50 cm/min. both in the longitudinal and transverse directions. Microscopic photograph of the section of the resulting stretched sheet indicated that fine and dense voids are formed from the surface layer towards the inner layer, and fine and dense voids are formed on the surface. The density of the resulting sheet was 0.508 g/cm³. The stretched sheet so obtained had excellent whiteness, non-transparency, and physical strengths. The printability test indicated that it has good ink setting and drying properties. The sheet obtained had stiffness, feel, printability and graphic properties like paper, and exhibited better printability such as ink setting and drying properties than the commercially available art paper. The sheet proved useful as printing paper, wrapping paper, and papers for use in building and decorative materials.

EXAMPLE 122

Low pressure polyethylene resin (having a melting temperature of 126°C.) was heated by a kneading roll heated at 150°C., ad formed into a 0.5 mm thick sheet by a heat press heated at 180°C. The sheet was cooled to room temperature, and the entire sheet was maintained at 160°C. The sheet was then passed three times through rolls whose surfaces were maintained at 120°C. The surface of the sheet was cooled to 120°C., but the inner layer was maintained at about 160°C. by adjusting the rate of moving the sheet through the rolls to 12.0 meters per minute. Immediately thereafter, the sheet was stretched to 3.0 times its original length both in the longitudinal and transverse directions. Microscopic examination of the section of the stretched sheet indicated that the surface layers have a porous structure, and the inner layer is voidless. The density of the sheet was 0.770 g/cm³. The sheet so obtained was cooled to room temperature, and then maintained at 120°C. Thereafter, the sheet was stretched to 1.5 times the primarily stretched length at a rate of 80 cm/min. both in the longitudinal and transverse directions. Microscopic photograph of the section of the stretched sheet indicated that both the surface and inner layers have a porous structure, and the void size of the surface layers differs from that of the inner layer. The sheet had luster and good whiteness, non-transparency and physical strengths. The density of the sheet was 0.563 g/cm³.

EXAMPLES 123 TO 125

Each of the olefinic resin compositions shown in Table 10 was formed into a 0.5 mm thick sheet in the same manner as set forth in Example 122, and stretched at 100 cm/min. under the primary stretching conditions shown in Table 10. The resulting sheet had porous surface layers and a voidless inner layer like the primarily stretched sheet obtained in Example 122. The sheet was cooled to room temperature, and then stretched at a rate of 80 cm/min. under the secondary stretching conditions given in Table 10. Microscopic photograph of the section of the sheet indicated that voids were formed also in the inner layer. The resulting sheet had low density and therefore was light in weight. It had exellent non-transparency and physical strengths, and good printability such as ink setting and drying properties.

TABLE 10

| | Composition of unstretched sheet | | Melting temperature of the olefinic resin (°C.) | Primary stretching conditions | | |
|---|---|---|---|---|---|---|
| Examples Nos. | Ingredients | Amounts in parts by weight | | Temperature of the surface layer (°C.) | Temperature of the inner layer (°C.) | Stretch ratio (X in one direction) |
| 123 | Low pressure polyethylene | | 132 | 126 | 160 | 3.0 |
| 124 | Low pressure polyethylene | 100 | 126 | 120 | 160 | 3.0 |
| | Chlorinated polyethylene | 5 | | | | |
| 125 | Low pressure polyethylene | 100 | 126 | 80 | 160 | 3.0 |
| | Chlorinated polyethylene | 5 | | | | |
| 126 | Low pressure polyethylene | 100 | 126 | 120 | 160 | 1.8 |
| | Chlorinated polyethylene | 5 | | | | |
| 127 | Low pressure polyethylene | 100 | 126 | 120 | 160 | 6.0 |
| | Chlorinated polyethylene | 5 | | | | |
| 128 | Low pressure polyethylene | 100 | 126 | 120 | 160 | 3.0 |
| | Silica powder | 10 | | | | |
| 129 | Polypropylene | | 174 | 140 | 200 | 3.0 |
| 130 | do | 100 | 174 | 140 | 200 | 3.0 |
| | Chlorinated polyethylene | 5 | | | | |
| 131 | Polypropylene | 100 | 174 | 140 | 200 | 3.0 |
| | Polybutadiene | 5 | | | | |
| 132 | Polypropylene | 100 | 174 | 140 | 200 | 1.8 |
| | Polybutadiene | 5 | | | | |
| 133 | Polypropylene | 100 | 174 | 140 | 200 | 6.0 |
| | Polybutadiene | 5 | | | | |
| 134 | Polypropylene | 100 | 174 | 140 | 200 | 6.0 |
| | Polybutadiene | 5 | | | | |

| Example Nos. | Density of the primarily stretched sheet (g/cm³) | Secondary stretching conditions Temp. (°C.) | Stretch ratio | Density of the secondarily stretched sheet (g/cm³) |
|---|---|---|---|---|
| 123 | 0.765 | 110 | 1.5 | 0.555 |
| 124 | 0.760 | 110 | 1.5 | 0.540 |
| 125 | 0.738 | 80 | 1.5 | 0.525 |
| 126 | 0.795 | 110 | 1.2 | 0.735 |
| 127 | 0.427 | 110 | 1.5 | 0.385 |
| 128 | 0.754 | 110 | 1.5 | 0.538 |
| 129 | 0.748 | 140 | 1.5 | 0.485 |
| 130 | 0.731 | 140 | 1.5 | 0.465 |
| 131 | 0.727 | 140 | 1.5 | 0.460 |
| 132 | 0.772 | 140 | 1.2 | 0.702 |
| 133 | 0.405 | 140 | 1.8 | 0.357 |
| 134 | 0.405 | 80 | 1.8 | 0.323 |

EXAMPLES 135 TO 136

Each of the resin compositions given in Table 11 below was kneaded by a kneading roll heated at 160°C., formed into a 0.5 mm thick sheet by calender rolling, and then stretched under the same stretching conditions as set forth in Example 122. The resulting sheet had porous surface layers and a voidless inner layer. The sheet was further stretched under the same secondary stretching conditions as set forth in Example 122 to form a sheet in which the inner layer also had fine and dense voids. The results are given in Table 11.

TABLE 11

| Example No. | Composition of unstretched sheet Ingredients | Amount in parts by weight | Melting temperature of the main olefinic resin (° C.) | Density of sheet after the primary stretching (g./cm.³) | Density of the sheet after the secondary stretching (g./c.m.³) |
|---|---|---|---|---|---|
| 135 | Low pressure polyethylene | 100 | 126 | 0.727 | 0.503 |
|  | Ethylene/vinyl acetate copolymer | 10 |  |  |  |
|  | Polybutadiene | 20 |  |  |  |
|  | Polystyrene | 10 |  |  |  |
|  | Silica powder | 30 |  |  |  |
|  | Titanium oxide | 5 |  |  |  |
|  | Zinc sulfide/barium sulfate mixture | 5 |  |  |  |
| 136 | Medium low pressure polyethylene | 50 | 132 | 0.753 | 0.545 |
|  | High pressure polyethylene resin | 50 |  |  |  |
|  | Ethylene/vinyl acetate copolymer | 30 |  |  |  |
|  | Polystyrene | 15 |  |  |  |
|  | Kaolin | 25 |  |  |  |
|  | Diatomaceous earth | 25 |  |  |  |
|  | Titanium oxide | 7 |  |  |  |

EXAMPLE 137

| | Parts |
|---|---|
| Polypropylene resin | 110 |
| Phenoxy resin | 10 |
| Polybutadiene | 20 |
| Diatomaceious earth | 20 |
| Silica powder | 20 |
| Titanium oxide | 7 |

A composition of the foregoing ingredients (the melting temperature of the polypropylene resin being 174°C.) was kneaded for 15 minutes by a kneading roll heated at 180°C., and formed into a 0.5 mm thick sheet by a heat press. The sheet was cooled to room temperature, and then heated to 200°C. Thereafter, the sheet was passed three times through rolls whose surfaces were maintained at 140°C. Immediately after passage, the sheet was stretched to 3 times its original length both in the longitudinal and transverse directions. Microscopic observation of the stretched sheet indicated that the surface layers have a porous structure, and the inner layer is voidless because of melting.

The stretched sheet was cooled to room temperature, and heated to 140°C. The sheet was then stretched to 3 times its primarily stretched length at a rate of 50 cm/min. both in the longitudinal and transverse directions. Microscopic examination of the section of the resulting sheet indicated that the inner layer is also porous. The resulting sheet had excellent whiteness, non-transparency and physical strengths. The surface of the sheet exhibited feed and appearance like those of leather. It had stiffness and printability comparable to paper from a material of natural origin. Such sheets to which gravure printing was applied proved useful as wrapping paper, cushion wrapping paper, and papers for use in building and decorative materials.

EXAMPLE 138

Both ends of each of the stretched sheets obtained in Examples 1, 21, 42, 58, 88, 102 and 122 were fixed with a fixing device, and maintained at 120°C. When the entire sheet shrank by 5 percent, the sheet was rapidly cooled. It was found that the shrunk sheet had a finer and denser porous structure and a more smooth surface. The shrunk sheet exhibited stiffness and feel similar to those of paper from a material of natural origin, and proved useful as printing paper and wrapping paper. The density of the sheet before and after the shrinking treatment is shown below.

| Stretched sheet of Example No. | Density of the stretched sheet (g/cm³) | Density of the shrunk sheet (g/cm³) |
|---|---|---|
| 1 | 0.665 | 0.680 |
| 21 | 0.645 | 0.672 |
| 42 | 0.520 | 0.541 |
| 58 | 0.540 | 0.557 |
| 88 | 0.510 | 0.525 |
| 102 | 0.560 | 0.574 |
| 122 | 0.563 | 0.578 |

EXAMPLE 139

Each of the stretched sheets obtained in Examples 1, 21, 42, 58, 88, 102 and 122 was subjected to supercalendering in three stages at a pressure of 50 kg/cm². The sheet so obtained had a finer and denser surface layers as compared with the sheet before calendering treatment. The sheet calendered had excellent surface luster, smoothness and strength and excellent stiffness. The luster of the sheet before and after the treatment is given below.

| Stretched sheet of Example No. | Luster before treatment (%) | Luster after treatment (%) |
|---|---|---|
| 1 | 21 | 29 |
| 21 | 19 | 27 |
| 42 | 24 | 32 |

| | | |
|---|---|---|
| 58 | 22 | 31 |
| 88 | 20 | 28 |
| 102 | 25 | 35 |
| 122 | 24 | 33 |

We claim:

1. A process for producing a synthetic paper which comprises
   A. stretching multiaxially an unstretched sheet comprising a blend of i 100 parts by weight of an olefin resin selected from the group consisting of homopolymers and copolymers of $C_2 - C_4$ α-olefins and blends thereof, having a melt index of not more than 10; and
   ii. 5 to 100 parts by weight of a thermoplastic resin having poor compatibility with said olefin resin and selected from the group consisting of styrene resins, polyacetal resins, polyacrylate resins, vinyl chloride resins, vinyl acetate resins and phenoxy resins; and
   iii. 20 to 300 parts by weight of a finely powdered inorganic filler, while both surface layers are maintained at a temperature at least 10°C. higher than that of the interior layer of the sheet but lower than the melting temperature of said olefinic resin, and
   B. further stretching uniaxially or multiaxially the resulting stretched sheet at a temperature not higher than the melting temperature of said olefinic resin.

2. The process of claim 1, in which the further stretching step is carried out at a temperature of not more than the melting temperature of said olefinic resin and lower than the temperature of the surface layers employed at the initial stretching.

3. The process of claim 1, in which said inorganic filler is selected from the group consisting of diatomaceous earth, silica, talc, kaolin, zeolite, mica, asbestos, calcium carbonate, magnesium carbonate, calcium sulfate, clay, alumina, barium sulfate, zinc sulfate, lithopone, titanium oxide and zinc flower.

4. The process of claim 1, in which the stretched sheet finally obtained is heat-treated at a temperature below the melting temperature of said olefinic resin under a tension which permits shrinking of the sheet.

5. The process of claim 1, in which the stretched sheet finally obtained is callender rolled.

6. The process of claim 1 wherein the melt index of the olefin resin is 0.05 to 5.

* * * * *